United States Patent [19]

Lazet

[11] 4,094,658
[45] June 13, 1978

[54] FORMING A FALLING CURTAIN OF MOLTEN GLASS

[75] Inventor: Frank J. Lazet, Media, Pa.

[73] Assignee: PQ Corporation, Valley Forge, Pa.

[21] Appl. No.: 828,140

[22] Filed: Aug. 29, 1977

[51] Int. Cl.² .................. C03B 37/06; C03B 17/00
[52] U.S. Cl. ............................................ 65/90; 65/5; 65/16; 65/21; 65/83; 65/99 A
[58] Field of Search .............. 65/5, 16, 21, 83, 84, 65/90, 97, 99 A, 182 R

[56] References Cited

U.S. PATENT DOCUMENTS

| | | | |
|---|---|---|---|
| 3,794,475 | 2/1974 | Lazet et al. | 65/5 |
| 3,834,975 | 9/1974 | Brichard | 65/90 X |
| 3,840,359 | 10/1974 | Lazet | 65/5 |
| 4,015,964 | 4/1977 | Levecque et al. | 65/5 |

Primary Examiner—Arthur D. Kellogg
Attorney, Agent, or Firm—Ernest G. Posner; Fred C. Philpitt; J. S. Stephen Bobb

[57] ABSTRACT

A free-falling curtain of molten glass that is uniform in thickness and temperature is formed by flowing the glass over the lip of a forehearth after conditioning the glass in said forehearth. The forehearth is constructed to provide an increasing rate of fall as the glass travels, flows from the furnace through the forehearth and progressively cools. The floor of the forehearth is essentially the mirror image of the viscosity versus temperature curve of the material being treated.

Other molten materials that become viscous as they cool can also be treated by the method of my invention to provide a uniform falling curtain of said material.

10 Claims, No Drawings

FORMING A FALLING CURTAIN OF MOLTEN GLASS

BACKGROUND OF THE INVENTION

This invention relates to the formation of a falling curtain of molten silicate glass that is required in the production of silicate glass flakes and/or fibers by atomization of said falling curtain. More particularly, this invention provides an improvement in said process by providing a falling curtain that is uniform in temperature and thickness.

U.S. Pat. Nos. 3,794,475 and 3,840,359, to Lazet, teach methods of forming flakes or fibers of soluble silicate glass. Molten glass is formed into a falling curtain which is fragmented into flakes or fibers by a stream of high pressure gas or liquid. The production of high yields of uniformly sized flakes or fibers by these processes has been difficult. The most important factor involved in these preparations appear to be the viscosity of the molten glass and the uniformity of the falling curtain.

It is an object of this invention to provide a falling curtain of silicate glass which is of uniform thickness and temperature. It is a further object of this invention to provide a forehearth which promotes a flow of molten glass at a uniform depth as the glass is cooled to the temperature required for the formation of fibers and flakes.

SUMMARY OF THE INVENTION

A uniform falling curtain of molten material that becomes viscous as it cools can be formed by conditioning said material in a forehearth. In order to provide a falling curtain which is uniform as to temperature and thickness, the glass must be maintained at a uniform depth while being conditioned in the forehearth. I have found that molten glass can flow through a forehearth at a uniform depth if the rate of fall or pitch of the floor in the forehearth increases in relation to the rate of glass cooling.

THE INVENTION

The success of the processes taught in U.S. Pat. Nos. 3,794,475 and 3,840,359, hereby incorporated by reference, is dependent upon the formation of a falling curtain of molten glass which is uniform in thickness and in temperature. The soluble silicate glasses employed in these processes are prepared in a furnace of the open hearth type of fusing a source of alkali metal, usually sodium carbonate and a source of silica, usually sand. The fusion is carried out at a temperature above 2000° F therefore, the glass when drawn is above 2000° F. The temperature required for atomization is below about 1900° F so that the glass must be cooled. The glass is drawn into a forehearth and cooled as it flows from the furnace. Upon flowing over the forehearth lip, a falling curtain is formed. Several factors prevent the formation of the falling curtain in a uniform thickness and temperature. The glass near the edges of the forehearth cools more rapidly than that near the center, so that the falling curtain will be non-uniform in temperature. The higher viscosity of the cooler glass will also cause the falling curtain to be thicker near the edges. Additionally, the thickness of the falling curtain should be controlled to about one inch or less. This control is difficult to achieve because of the viscosity increase as the glass cools. The increasing drag of the cooling glass causes the initially shallow stream to become deeper and less uniform.

I have found that a uniform falling curtain of molten glass can be formed by conditioning the glass in a forehearth constructed in such a manner that the level of the glass remains the same as it flows through the device. The forehearth is constructed with a compound slope or rate of fall. The rate of fall should be directly proportioned to the viscosity of the material being treated or inversely proportioned to the temperature. I prefer that the slope of the forehearth be such that its floor approximates the mirror image of the temperature versus viscosity curve for the material being treated. This curve is drawn with the temperature as the abcissa and the viscosity as the ordinate. The glass is maintained at a uniform temperature across the forehearth by the use of sidewall burners to ameliorate the heat loss of the glass flowing near the walls. By observing these practices, a uniform flow of glass can be cooled in the forehearth to provide the desired results.

In some cases, it is desired that the depth of the glass stream as it flows over the forehearth lip be somewhat less than the depth throughout the remainder of the device. To achieve this reduction in depth, the last section of the forehearth is constructed with an even greater pitch so that the speed of the glass flow is increased and the depth reduced.

EXAMPLES

The following Examples illustrate certain embodiments of my invention and certain aspects of the prior art.

EXAMPLE 1

This Example illustrates the prior art of using a forehearth with a constant slope. The forehearth was 20 feet long and had a constant slope of ¾ inch per foot. Sodium silicate glass having a composition of 2.37 moles of $SiO_2$ per mole of $Na_2O$ was prepared in a conventional glass furnace at a temperature of 2000° F. The molten glass was drawn into the forehearth at the rate of 2500 lbs./hr. and the level of the molten glass was ½ inch as drawn from the furnace. The depth was over 2 inches near the forehearth lips and the depth was not uniform across the width of the forehearth. The falling curtain provided was not uniform and when atomized, gave rise to a number of products including large globs of glass, some fibers and a few flakes.

EXAMPLE 2

This Example illustrates the process of my invention and the advantages it provides. In this case, the 20 ft. forehearth was divided into 5 four ft. sections. The rate of fall for each zone was:

| ZONE B | RATE OF FALL (INCHES PER FOOT) |
|---|---|
| 1 | ⅜ |
| 2 | ⅝ |
| 3 | ⅝ |
| 4 | ⅞ |
| 5 | 1½ |

Zone 1 is nearest the furnace while zone 5 is at the end of the forehearth. The glass prepared as described in Example 1 was drawn into the forehearth which was equipped with sidewall burners. The initial depth of the glass stream was 1 inch and it could be seen that the depth of the glass did not increase and that the flow was uniform across the forehearth. The glass flowed over the forehearth lip to form a uniform falling curtain.

EXAMPLE 3

The process of Example 2 was repeated except that the forehearth was altered so that zones 4 and 5 had rates of fall of 1 inch per ft. and 1½ inches per ft., respectively. In this case, the depth of the stream flowing over the forehearth lip was ⅛ inch. The uniform falling curtain was atomized as desired to provide flakes or fibers depending upon the temperature of the glass.

I claim:

1. A method for forming a falling curtain of molten material, characterized by becoming viscous as it cools, said falling curtain being of controlled and uniform thickness and of uniform temperature, comprising the steps of:
    (a) forming a bed of said molten material;
    (b) drawing said material from the bed into a forehearth which has a compound rate of fall;
    (c) allowing said molten material to flow through the forehearth, thereby cooling it;
    (d) applying heat to the material near the side walls of the forehearth thereby preventing non-uniform cooling of the material; and
    (e) allowing the molten material to flow over the lip of the forehearth, thereby forming the desired falling curtain.

2. The method of claim 1 wherein the compound rate of fall is directly proportioned to the viscosity of the material as it cools.

3. The method of claim 1 wherein the compound rate of fall is such that the forehearth is a mirror image of the viscosity versus temperature curve of the material, wherein the temperature is the abcissa and the viscosity the ordinate.

4. The method of claim 1 wherein the molten material is glass.

5. The method of claim 4 wherein the glass is soluble silicate glass.

6. The method of claim 5 wherein the compound rate of fall is directly proportioned to the viscosity of the material as it cools.

7. The method of claim 5 wherein the compound rate of fall is such that the forehearth is a mirror image of the viscosity versus temperature curve of the soluble silicate glass, wherein the temperature is the abcissa and the viscosity is the ordinate.

8. A method for forming a falling curtain of soluble silicate glass, said falling curtain being of controlled and uniform thickness and of uniform temperature, comprising the steps of:
    (a) forming a bed of said molten glass;
    (b) drawing said molten glass from the bed into a forehearth which has a compound rate of fall;
    (c) allowing said molten glass to flow through the forehearth, thereby cooling it;
    (d) applying heat to the glass near the side walls of the forehearth, thereby preventing non-uniform cooling of the glass, and
    (e) allowing the molten glass to flow over the lip of the forehearth, thereby forming the desired falling curtain.

9. The method of claim 8 wherein the compound rate of fall is directly proportioned to the viscosity of the glass as it cools.

10. The method of claim 8 wherein the compound rate of fall is such that the forehearth is the mirror image of the viscosity versus temperature curve of the glass, wherein the temperature is the abcissa and the viscosity is the ordinate.

* * * * *